(12) United States Patent
Nakamura et al.

(10) Patent No.: US 8,830,550 B2
(45) Date of Patent: Sep. 9, 2014

(54) LIGHT DEFLECTOR, METHOD OF MANUFACTURING LIGHT DEFLECTOR, AND IMAGE DISPLAY DEVICE

(75) Inventors: Makiko Nakamura, Chino (JP); Yasushi Mizoguchi, Suwa (JP); Osamu Kobayashi, Minowa (JP)

(73) Assignee: Seiko Epson Corporation (JP)

( * ) Notice: Subject to any disclaimer, the term of this patent is extended or adjusted under 35 U.S.C. 154(b) by 366 days.

(21) Appl. No.: 12/849,182

(22) Filed: Aug. 3, 2010

(65) Prior Publication Data
US 2011/0032589 A1 Feb. 10, 2011

(30) Foreign Application Priority Data

Aug. 4, 2009 (JP) ................................. 2009-181273
May 6, 2010 (JP) ................................. 2010-106624

(51) Int. Cl.
*G02B 26/08* (2006.01)
*H04N 9/31* (2006.01)

(52) U.S. Cl.
CPC .......... *G02B 26/0833* (2013.01); *H04N 9/3129* (2013.01)
USPC .................................................... 359/224.1

(58) Field of Classification Search
CPC ............. G02B 26/0841; G02B 26/105; G02B 26/0833
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45

See application file for complete search history.

(56) References Cited

U.S. PATENT DOCUMENTS

| | | | |
|---|---|---|---|
| 7,268,929 B2 | 9/2007 | Asai | |
| 2002/0114053 A1 | 8/2002 | Yasuda et al. | |
| 2008/0239531 A1* | 10/2008 | Schenk et al. | 359/872 |
| 2009/0009444 A1* | 1/2009 | Heald et al. | 345/85 |

FOREIGN PATENT DOCUMENTS

| | | |
|---|---|---|
| JP | 2005-107069 | 4/2005 |
| JP | 2006-039156 | 2/2006 |
| JP | 2007-256419 A | 10/2007 |

* cited by examiner

*Primary Examiner* — Jennifer L. Doak
(74) *Attorney, Agent, or Firm* — Harness, Dickey & Pierce, P.L.C.

(57) ABSTRACT

A light deflector includes: a movable plate; an elastic support section having a first end coupled to the movable plate and adapted to support the movable plate rotatably around a predetermined axis; a support member coupled to a second end of the elastic support section; and a light absorbing section having a light absorbing property, wherein the elastic support section has an upper surface, a lower surface, and at least one side surfaces, each of the side surfaces being formed of one or more tilted surfaces existing outside either one of the upper surface and the lower surface, and the light absorbing section is disposed on the upper surface and the at least one side surfaces of the elastic support section.

10 Claims, 10 Drawing Sheets

LIGHT DEFLECTOR, METHOD OF MANUFACTURING LIGHT DEFLECTOR, AND IMAGE DISPLAY DEVICE

BACKGROUND

1. Technical Field

The present invention relates to a light deflector, using a micro-electro-mechanical system (MEMS) technology, a method of manufacturing the light deflector, and an image display device.

2. Related Art

In the light deflector intended to be applied to, for example, a display or a printer for performing image drawing using a laser beam, further speeding-up of light scanning is required in order for improving the resolution of the image. However, since there is a limitation on the improvement in the performance of polygon mirrors or galvanometer mirrors used presently, a mirror device manufactured by working upon a silicon substrate using a micro-electro-mechanical system (MEMS) is thought to be a promising light deflector replacing these elements. Since such an MEMS mirror can be driven at a resonant frequency higher than those of the polygon mirror and the galvanometer mirror, it becomes possible to form images with higher resolution.

In the MEMS mirror the laser beam is applied to the mirror section, and the object is irradiated with the reflected light, thereby performing the image drawing. If the light is reflected by other sections than the mirror section, there is concern that the reflected light exerts an influence on the image as stray light. Therefore, there has been made a device for preventing the stray light as much as possible by providing an antireflection film to the portions other than the mirror section.

In JP-A-2006-39156 (Document 1), for example, there is disclosed a planar actuator having a planar movable plate, a pair of torsion bars for rotatably pivoting the movable plate, and a mirror section provided to the movable plate, and provided with an antireflection film on the portion other than the mirror section.

Further, in JP-A-2005-107069 (Document 2), it is described to reduce the reflexibility of beam sections and fixed sections in an optical scanner, to which unwanted light is input, reflecting the light so as to be lower than that of the reflecting surface.

When forming the antireflection film using a typical film formation method such as a sputtering process or a plating process, if the side surfaces of the movable plate and the torsion bars are formed substantially perpendicular to the upper surface, it is difficult to form the even antireflection films on the side surfaces. However, since the reflection on the side surface of the movable plate also occurs by turning the movable plate, it is desirable to provide the antireflection film also to the side surface. In the actuator described in the Document 1, since the side surface of the movable plate is arranged to be substantially perpendicular to the surface, it is difficult to provide the side surface with an even antireflection film. Further, in the optical scanner described in the Document 2, it is desirable to form the even antireflection films also on the side surfaces of the beam sections and the fixed section.

As described above, in the actuator described in the Document 1, since the function of preventing the light reflection on the side surfaces of the movable plate, the torsion bars, and so on becomes insufficient, there arises a problem that the light is reflected by the side surfaces of the movable plate, the torsion bars, and so on when turning the movable plate, and the reflected light exerts a harmful influence on the image as the stray light.

Similarly, in the optical scanner described in the Document 2, since the function of preventing the light reflection on the side surfaces of the beam sections, the fixed section, and so on becomes insufficient, there arises a problem that the stray light exerts a harmful influence on the image.

SUMMARY

An advantage of some aspects of the invention is to provide a light deflector capable of preventing occurrence of stray light, a method of manufacturing the light deflector, and an image display device.

According to an aspect of the invention, there is provided a light deflector including a movable plate, an elastic support section having a first end coupled to the movable plate and adapted to support the movable plate rotatably around a predetermined axis, and a support member coupled to a second end of the elastic support section, and a light absorbing section having a light absorbing property, wherein the elastic support section has an upper surface, a lower surface, and at least one side surfaces, each of the side surfaces being formed of one or more tilted surfaces existing outside either one of the upper surface and the lower surface, and the light absorbing section is disposed on the upper surface and the at least one side surfaces of the elastic support section.

Thus, since the even light absorbing section can be formed as a film also on the side surfaces of the elastic support section even with the typical film forming method such as a sputtering method, reflection on the side surfaces of the elastic support section can be prevented.

Further, it is also possible that the support member has an upper surface, a lower surface, and at least one side surfaces, each of the side surfaces being formed of one or more tilted surfaces existing outside either one of the upper surface and the lower surface, and the light absorbing section is disposed on the upper surface and the at least one side surfaces of the support member.

Thus, since the even light absorbing section can be formed as a film also on the side surfaces of the support member even with the typical film forming method such as a sputtering method, reflection on the side surfaces of the support member can be prevented.

Further, it is also possible that the movable plate has an upper surface, a lower surface, and at least one side surfaces, each of the surfaces being provided with a reflecting section, and each of the side surfaces being formed of one or more tilted surfaces existing outside either one of the upper surface and the lower surface of the movable plate, and the light absorbing section is disposed on the at least one side surfaces of the movable plate.

Thus, since the even light absorbing section can be formed as a film also on the side surfaces of the movable plate even with the typical film forming method such as a sputtering method, reflection on the side surfaces of the movable plate can be prevented.

According to still another aspect of the invention, there is provided a method of manufacturing a light deflector including the steps of (a) forming a movable plate having an upper surface, a lower surface, and at least one side surfaces, an elastic support section having an upper surface, a lower surface, and at least one side surfaces, having a first end coupled to the movable plate, and adapted to support the movable plate rotatably around a predetermined axis, and a support member coupled to a second end of the elastic support section, (b) forming a light absorbing section on the upper surface and the at least one side surfaces of the elastic support section, and (c) forming a reflecting section on the upper surface of the movable plate, wherein in step (a), each of the side surfaces of the elastic support section is formed of one or more tilted surfaces existing outside either one of the upper surface and the lower surface of the elastic support section.

Thus, since the even light absorbing section can be formed as a film also on the side surfaces of the elastic support section even with the typical film forming method such as a sputtering method, reflection on the side surfaces of the elastic support section can be prevented.

Further, it is also possible that in step (a), each of the side surfaces of the support member is formed of one or more tilted surfaces existing outside either one of the upper surface and the lower surface of the support member.

Thus, since the even light absorbing section can be formed as a film also on the side surfaces of the support member even with the typical film forming method such as a sputtering method, reflection on the side surfaces of the support member can be prevented.

Further, it is also possible that in step (a), each of the side surfaces of the movable plate is formed of one or more tilted surfaces existing outside either one of the upper surface and the lower surface of the movable plate, and in step (b), the light absorbing section is formed on the at least one side surfaces of the movable plate.

Thus, since the even light absorbing section can be formed as a film also on the side surfaces of the movable plate even with the typical film forming method such as a sputtering method, reflection on the side surfaces of the movable plate can be prevented.

Further, according to still yet another aspect of the invention, there is provided a light deflector including a movable plate provided with a light reflecting section having light reflectivity, a support section, a coupling section adapted to couple the movable plate rotatably to the support section, and a light absorbing section having a light absorbing property, wherein the coupling section has a pair of tilted surfaces, which have a distance from each other gradually increasing along a direction from a first surface side of the movable plate toward a second surface side of the movable plate in a cross-sectional view perpendicular to a central axis of rotation of the movable plate, and are tilted with respect to a normal line of a plate surface of the movable plate corresponding to increase in the distance, and the light absorbing section is disposed on the tilted surfaces of the coupling section.

Thus, the even light absorbing section can be formed as a film on the tilted surfaces of the coupling section even with the typical film forming method such as a sputtering method or an evaporation method. Therefore, the function (the light absorbing function) of the light absorbing section formed on the tilted surface of the coupling section to prevent the light reflection can be made superior. Therefore, even if the light enters these tilted surfaces when turning the movable plate, the stray light can be prevented from occurring, and in the case, for example, in which the light deflector is used for an image display device, deterioration in image quality due to the stray light can be prevented.

Further, in the light deflector according to the aspect of the invention, it is preferable that the support section has a pair of tilted surfaces, which have a distance from each other gradually increasing along a direction from a first surface side of the movable plate toward a second surface side of the movable plate in a cross-sectional view perpendicular to a central axis of rotation of the movable plate, and are tilted with respect to a normal line of a plate surface of the movable plate corresponding to increase in the distance, and the light absorbing section is disposed on the tilted surfaces of the support section.

Thus, the even light absorbing section can be formed as a film on the tilted surfaces of the support section even with the typical film forming method such as a sputtering method or an evaporation method. Therefore, the function of the light absorbing section formed on the tilted surface of the support section to prevent the light reflection can be made superior. Therefore, even if the light enters these tilted surfaces, the stray light can be prevented from occurring, and in the case, for example, in which the light deflector is used for an image display device, deterioration in image quality due to the stray light can be prevented.

Further, in the light deflector according to the aspect of the invention, it is preferable that the movable plate has a pair of tilted surfaces, which have a distance from each other gradually increasing along a direction from a first surface side of the movable plate toward a second surface side of the movable plate in a cross-sectional view perpendicular to a central axis of rotation of the movable plate, and are tilted with respect to a normal line of a plate surface of the movable plate corresponding to increase in the distance, and the light absorbing section having a light absorbing property is disposed on the tilted surfaces of the movable plate.

Thus, the even light absorbing section can be formed as a film on the tilted surfaces of the movable plate even with the typical film forming method such as a sputtering method or an evaporation method. Therefore, the function (the light absorbing function) of the light absorbing section formed on the tilted surface of the movable plate to prevent the light reflection can be made superior. Therefore, even if the light enters these tilted surfaces when turning the movable plate, the stray light can be prevented from occurring, and in the case, for example, in which the light deflector is used for an image display device, deterioration in image quality due to the stray light can be prevented.

The image display device according to this aspect of the invention is provided with the light emitting section for emitting light and the light deflector according to the aspect of the invention, and displays an image by scanning the light, which is emitted from the light emitting section, with the light deflector.

Thus, the deterioration of the image quality due to the stray light can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described with reference to the accompanying drawings.

First Embodiment

Figure 1:
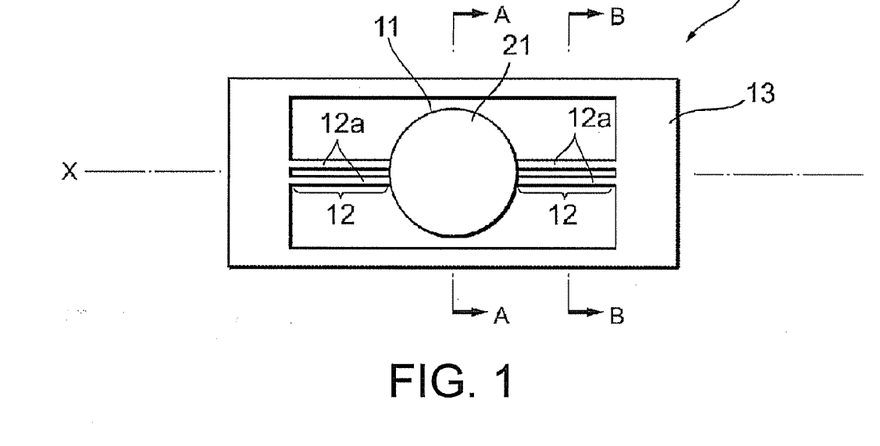
FIG. 1 is a top view showing a schematic configuration of a light deflector according to a first embodiment.
Figure 2:
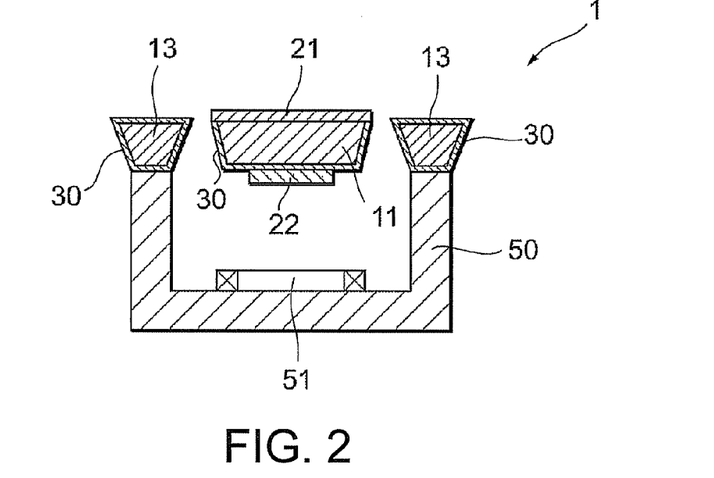
FIG. 2 is a cross-sectional view along the line A-A shown in FIG. 1.
Figure 3:
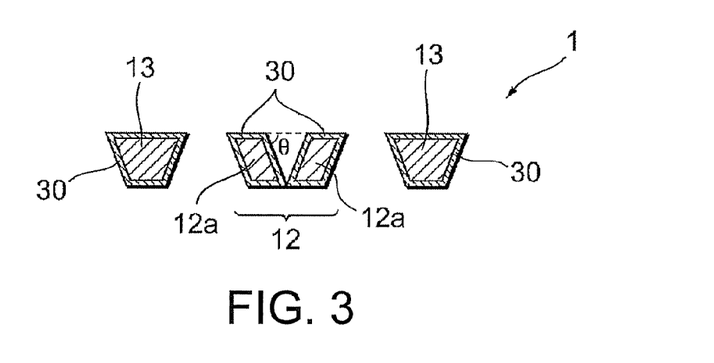
FIG. 3 is a cross-sectional view along the line B-B shown in FIG. 1.

FIG. 1 is a top view showing a schematic configuration of a light deflector 1 according to the present embodiment. FIG. 2 is a cross-sectional view along the line A-A shown in FIG. 1, and FIG. 3 is a cross-sectional view along the line B-B shown in FIG. 1. It should be noted that FIG. 3 shows only an elastic support section 12 and a support member 13 of the light deflector 1.

The light deflector 1 has a movable plate 11, a pair of elastic support sections (coupling sections) 12 having one end coupled to the movable plate 11 and for supporting the movable plate 11 rotatably around a rotational axis X (a central axis of rotation), and the support member (a support section) 13 coupled to the other ends of the elastic support sections 12. The movable plate 11, the elastic support sections 12, and the support member 13 are formed integrally by, for example, etching a silicon substrate. On the surface of the movable plate 11 there is formed a reflecting film (a reflecting section) 21.

The pair of elastic support sections 12 couple the movable plate 11 rotatably to the support member 13.

Each of the elastic support sections 12 is formed of a pair of rods 12a. The rods 12a each have a parallelogram cross-sectional shape (the shape of the cross-section perpendicular to the central axis of rotation), and are disposed so that the distance between the two rods 12a increases toward the upper surface side (the upper side in FIG. 3). Further, the angle θ with which the distance between the two rods 12a expands is 54.73 °.

To the reverse side (the lower side in FIG. 2) of the movable plate 11, there is bonded a magnet 22 via an adhesive not shown. The magnet 22 is magnetized in a direction perpendicular to the rotational axis X in the plan view of the movable plate 11. In other words, the magnet 22 has a pair of magnetic poles opposed to each other via the rotational axis X and having respective polarities different from each other. The support member 13 is bonded to a holder 50, on which a coil 51 for driving the movable plate 11 is disposed.

In the light deflector 1, a current (an alternating-current) varying periodically is supplied to the coil 51. In response therewith, the coil 51 alternately generates a magnetic field directed upward (on the side of the movable plate 11) and a magnetic field directed downward. Thus, the movable plate 11 is turned around the rotational axis X while torsionally deforming the elastic support sections 12 such that one of the pair of magnetic poles of the magnet 22 comes closer to the coil 51 and the other thereof moves away therefrom.

FIG. 2 shows a vibration mirror of a drive method using the electromagnetic force between the magnet 22 and the coil 51. However, in the embodiment of the invention, a method of using electrostatic attractive force and a method using piezoelectric element can also be adopted. For example, in the case of the method using the electrostatic attractive force, the magnet 22 can be eliminated, and one or more electrodes opposed to the movable plate 11 are disposed instead of the coil 51. Further, an alternating-current voltage varying periodically is applied between the movable plate 11 and the electrodes to thereby act the electrostatic attractive force between the movable plate 11 and the electrodes, thus turning the movable plate 11 around the rotational axis X while torsionally deforming the elastic support sections 12.

The lower surface and the side surface of the movable plate 11, the upper surface, the lower surface, and the side surfaces of each of the elastic support sections 12, and the upper surface, the lower surface, and the side surfaces of the support member 13 are provided with light absorbing films (light absorbing sections) 30 formed thereon. The light absorbing films 30 are each a film made of, for example, Cr, Ni, or a resist, and have a property of absorbing light without reflecting it. It should be noted that the light absorbing films 30 each can also be formed of an antireflection film (i.e., a dielectric multilayer film composed of a plurality of dielectric layers with refractive indexes different from each other stacked one another) known to the public.

As shown in FIGS. 2 and 3, the side surfaces of the movable plate 11, the elastic support sections 12, and the support member 13 are each formed of a tilted surface located outside either one of the upper surface and the lower surface of the respective components. Since the movable plate 11 and the support member 13 each have a trapezoidal cross-sectional shape spreading in a direction from the lower surface toward the upper surface, the tilted surface forming the side surface is formed outside the lower surface. The elastic support sections 12 are each composed of the two rods 12a each having a parallelogram cross-sectional shape, and are each disposed so that the distance between the two rods 12a increases along the direction toward the upper surface. Therefore, the tilted surface forming the inner side surface 14a is formed outside the upper surface, and the tilted surface forming the outer side surface 14b is formed outside the lower surface.

As described above, the elastic support sections (the coupling sections) 12 each have pairs of tilted surfaces (side surfaces), each of which has a distance from each other gradually increasing along a direction from the side of the lower surface of the movable plate 11 toward the side of the upper surface thereof in the cross-sectional view perpendicular to the central axis of rotation (the rotational axis X) of the movable plate 11, and are tilted with respect to the normal line (the normal line of the plate surface of the movable plate 11) of the surface of the reflecting film 21 corresponding to the increase in the distance. Further, the support member (the support section) 13 has a pair of tilted surfaces (side surfaces), which have a distance from each other gradually increasing along a direction from the side of the lower surface of the movable plate 11 toward the side of the upper surface thereof in the cross-sectional view perpendicular to the central axis of rotation (the rotational axis X) of the movable plate 11, and are tilted with respect to the normal line of the surface of the reflecting film 21 corresponding to the increase in the distance. Further, the movable plate 11 has a pair of tilted surfaces (side surfaces), which have a distance from each other gradually increasing along a direction from the side of the lower surface of the movable plate 11 toward the side of the upper surface thereof in the cross-sectional view perpendicular to the central axis of rotation (the rotational axis X) thereof, and are tilted with respect to the normal line of the surface of the reflecting film 21 corresponding to the increase in the distance.

Further, the tilted surfaces of the coupling sections 12, the tilted surfaces of the support member 13, and the tilted surfaces of the movable plate 11 as described above are each provided with the light absorbing film 30 having a light absorbing property.

Hereinafter, a method of manufacturing the light deflector 1 will be explained. It should be noted that FIGS. 14 through 19 show the cross-sectional view similarly to that shown in FIG. 2.

First Process

Figure 4:
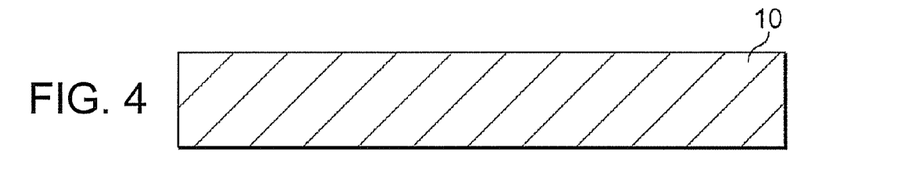
FIG. 4 is a process cross-sectional diagram showing a method of manufacturing the light deflector according to the first embodiment.
Figure 5:
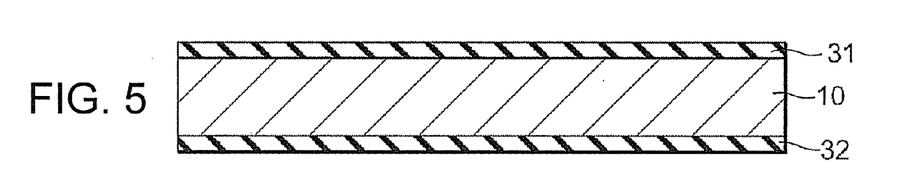
FIG. 5 is a process cross-sectional diagram showing the method of manufacturing the light deflector according to the first embodiment.

As shown in FIG. 4, a substrate 10 made of, for example, silicon is prepared. Then, as shown in FIG. 5, masks 31, 32 made of silicon oxide are formed on both surfaces of the substrate 10 by a thermal oxidation process. As the masks 31, 32, $SiO_2$ masks, SiN masks or the like can be used.

Here, as the substrate 10, a silicon substrate (a silicon single crystal plate) with the plane direction of (100) in the plate surface is preferably used although not limited thereto. By performing etching on the silicon substrate with the plane direction of (100), the movable plate 11, the support member 13, and the elastic support sections 12 provided with such tilted surfaces as described above can be formed easily.

Figure 6:
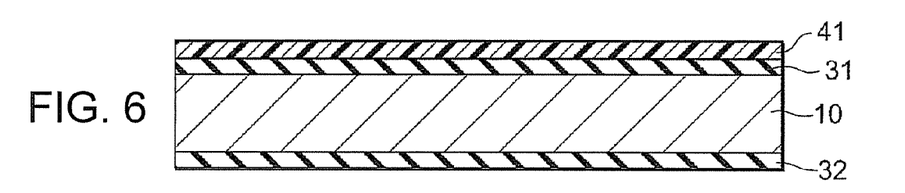
FIG. 6 is a process cross-sectional diagram showing the method of manufacturing the light deflector according to the first embodiment.
Figure 7:
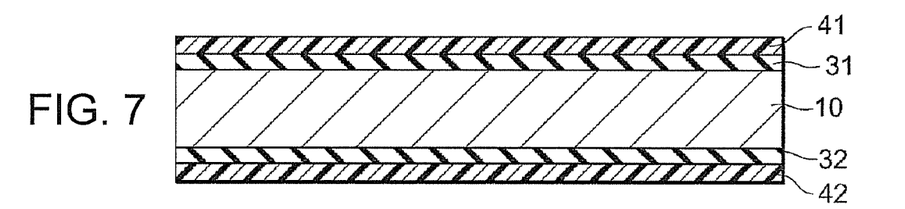
FIG. 7 is a process cross-sectional diagram showing the method of manufacturing the light deflector according to the first embodiment.

Subsequently, as shown in FIG. 6, a resist 41 is formed on the mask 31 on the side of the upper surface of the substrate 10. The resist can be either a positive resist or a negative resist. Subsequently, as shown in FIG. 7, a resist 42 is formed on the mask 32 on the side of the lower surface of the substrate 10.

Figure 8:
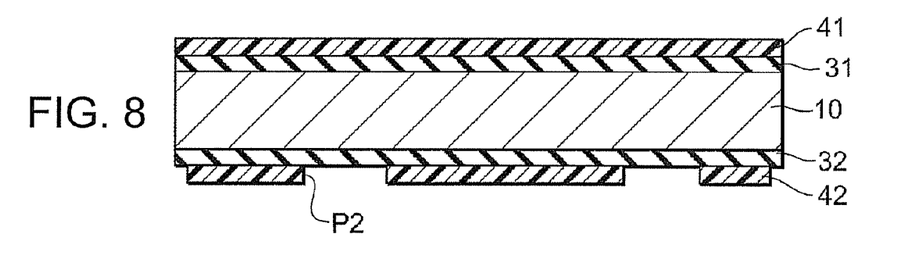
FIG. 8 is a process cross-sectional diagram showing the method of manufacturing the light deflector according to the first embodiment.

Subsequently, as shown in FIG. 8, an exposure process and a development process are performed on the resist 42 on the side of the lower surface of the substrate 10 to thereby provide a predetermined opening pattern P2 to the resist 42. The opening pattern P2 is, for example, a pattern for opening regions other than the movable plate 11, the elastic support sections 12, and the support member 13.

Figure 9:
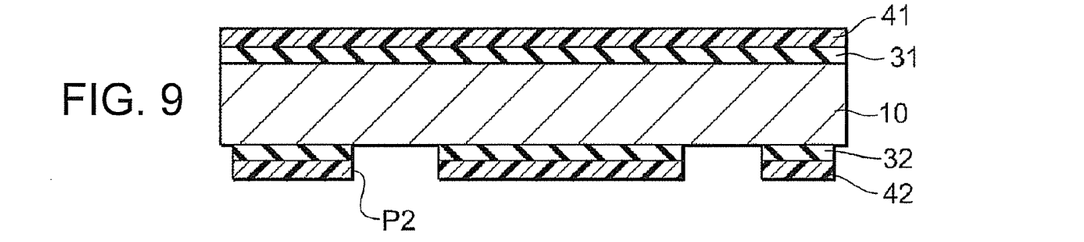
FIG. 9 is a process cross-sectional diagram showing the method of manufacturing the light deflector according to the first embodiment.

Subsequently, as shown in FIG. 9, an etching process is performed on the mask 32 on the side of the lower surface using the resist 42 as a mask. Thus, the opening pattern P2 of the resist 42 is transferred to the mask 32. In the etching process of the mask 32, buffered hydrofluoric acid (BHF), for example, is used.

Figure 10:
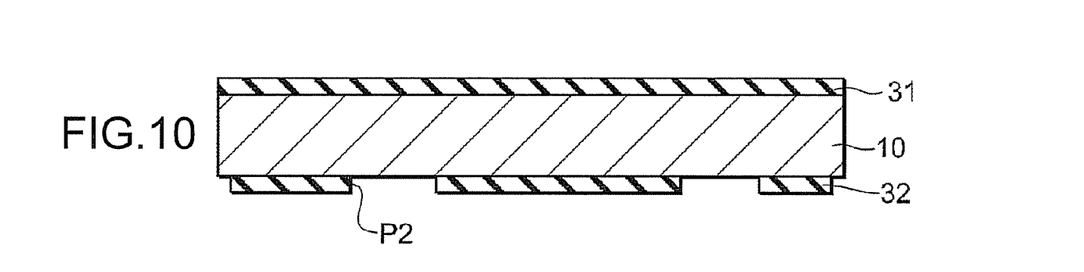
FIG. 10 is a process cross-sectional diagram showing the method of manufacturing the light deflector according to the first embodiment.

Subsequently, as shown in FIG. 10, the resists 41, 42 on the both sides of the substrate are removed. For removing the resists 41, 42, there is used a sulfuric acid cleaning process or an ashing process.

Figure 11:
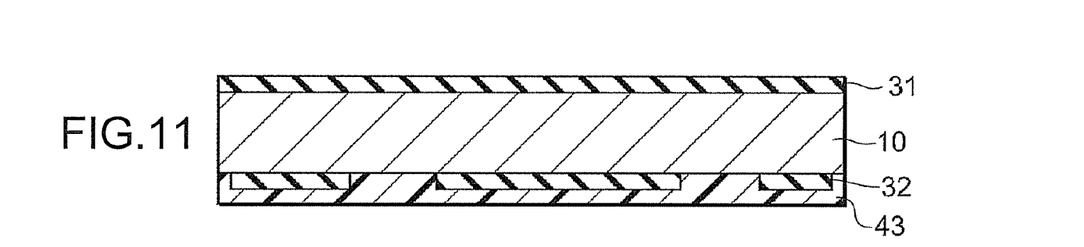
FIG. 11 is a process cross-sectional diagram showing the method of manufacturing the light deflector according to the first embodiment.
Figure 12:
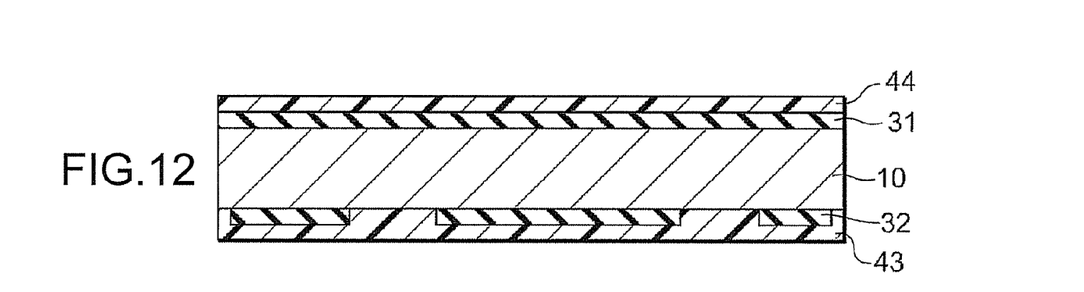
FIG. 12 is a process cross-sectional diagram showing the method of manufacturing the light deflector according to the first embodiment.

Subsequently, as shown in FIG. 11, a resist 43 is further formed on the side of the lower surface of the substrate 10. Further, as shown in FIG. 12, a resist 44 is further formed on the side of the upper surface of the substrate 10.

Figure 13:
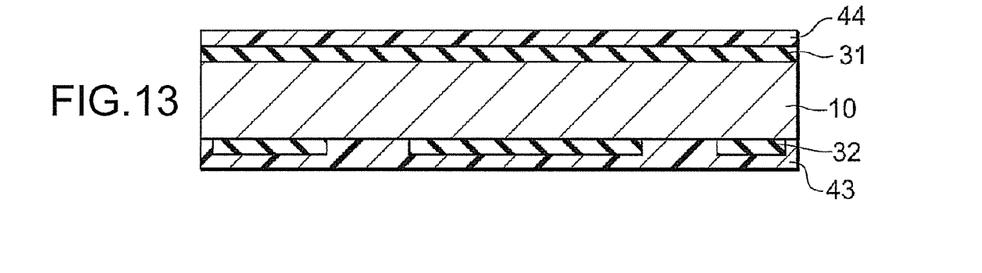
FIG. 13 is a process cross-sectional diagram showing the method of manufacturing the light deflector according to the first embodiment.

Subsequently, as shown in FIG. 13, an exposure process and a development process are performed on the resist 44 on the adverse side of the substrate 10 to thereby provide a predetermined opening pattern P1 to the resist 44. It should be noted that although in the present embodiment the opening pattern P1 is not formed in the cross-sectional surface shown in FIG. 13, the opening pattern P1 shown in FIG. 20 is formed in the cross-sectional surface corresponding to FIG. 3.

Figure 20:
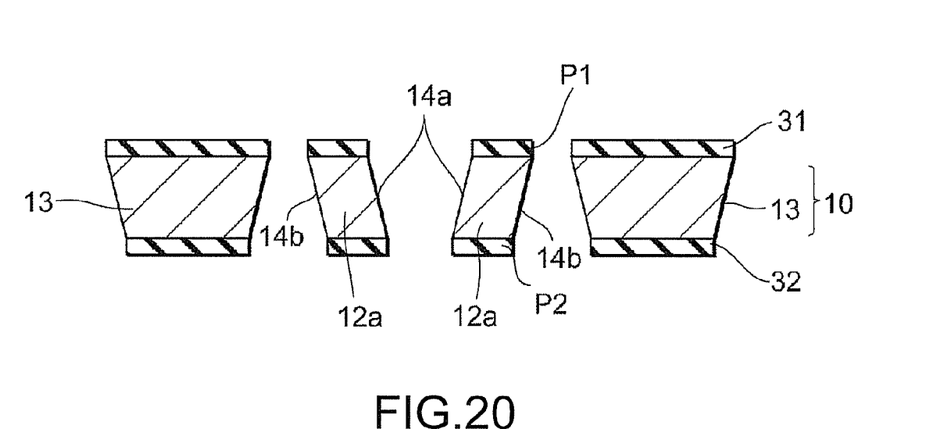
FIG. 20 is a process cross-sectional diagram showing the method of manufacturing the light deflector according to the first embodiment.
Figure 21A:
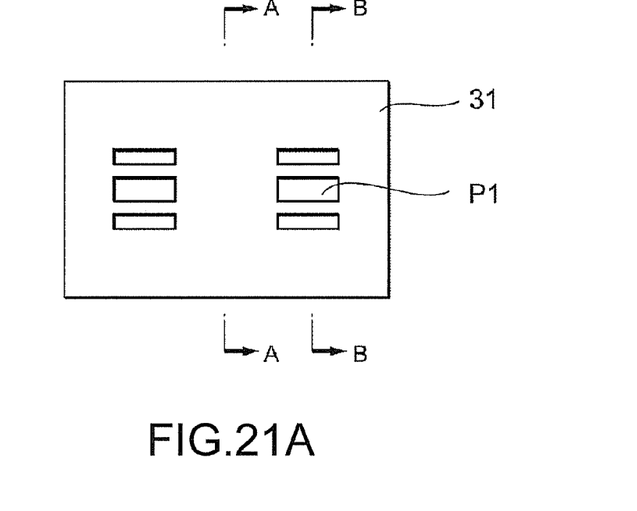
FIG. 21A is a plan view showing a pattern of a mask for the upper surface of a substrate according to the first embodiment.
Figure 21B:
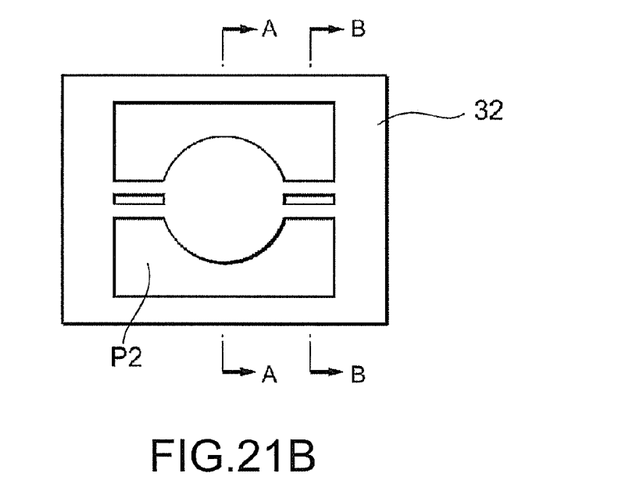
FIG. 21B is a plan view showing a pattern of a mask for the lower surface of the substrate according to the first embodiment.

FIG. 20 shows the opening pattern P1 and the opening pattern P2 in the cross-sectional surface corresponding to FIG. 3. By forming such an opening pattern as shown in FIG. 20, there are formed the elastic support sections 12 each having a cross-section shaped like a keystone and each having side surfaces each formed of a tilted surface as shown in FIG. 3. It should be noted that since the plane of Si with the crystal plane direction of (111) functions as an etching stopper in the wet etching process with KOH or the like, the side geometry composed of the surfaces having angles of $\theta=54.73°$ with the adverse surface is formed automatically. It should be noted that FIG. 21A shows a plan view showing the pattern of the mask 31 on the side of the upper surface of the substrate 10, and FIG. 21B shows a plan view showing the pattern of the mask 32 on the side of the lower surface of the substrate 10. The cross-section shown in FIG. 13 corresponds to the cross-section along the line A-A shown in FIGS. 21A, 21B, and the cross-section shown in FIG. 20 corresponds to the cross-section along the line B-B shown in FIGS. 21A, 21B.

Figure 14:
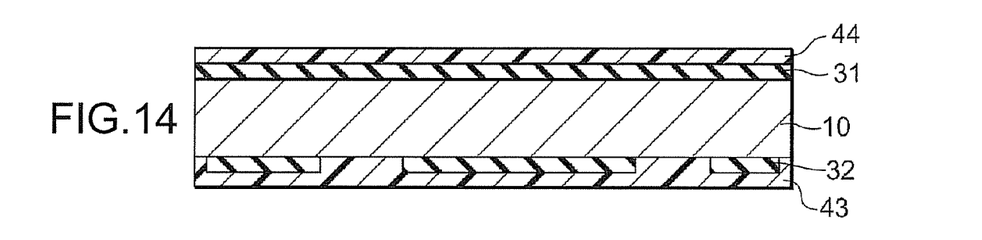
FIG. 14 is a process cross-sectional diagram showing the method of manufacturing the light deflector according to the first embodiment.

Subsequently, as shown in FIG. 14, an etching process is performed on the mask 31 on the side of the upper surface using the resist 44 as a mask. Thus, the opening pattern P1 of the resist 44 is transferred to the mask 31. In the etching process of the mask 31, buffered hydrofluoric acid (BHF), for example, is used.

Figure 15:
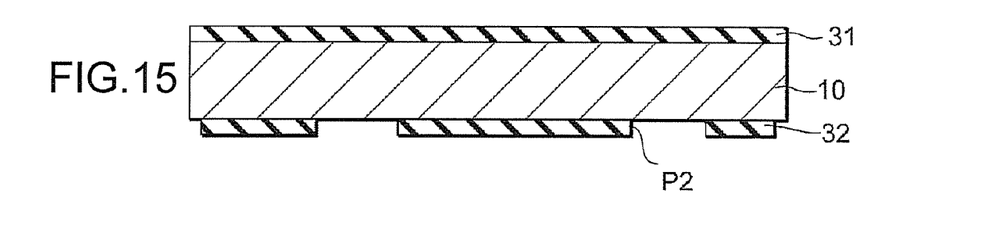
FIG. 15 is a process cross-sectional diagram showing the method of manufacturing the light deflector according to the first embodiment.

Subsequently, as shown in FIG. 15, the resists 43, 44 on the both sides of the substrate are removed. For removing the resists 43, 44, there is used a sulfuric acid cleaning process or an ashing process.

Figure 16:
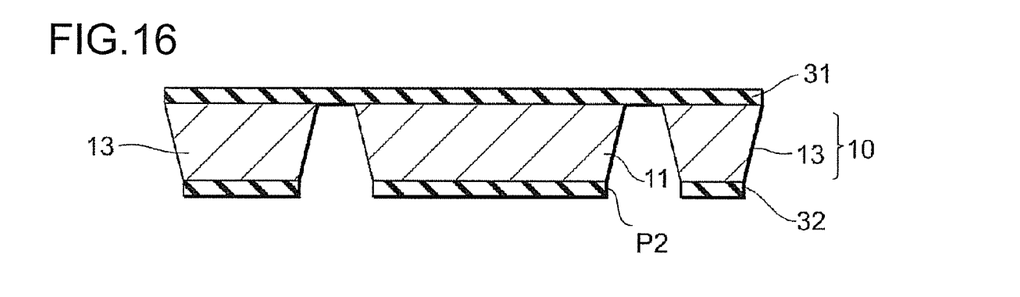
FIG. 16 is a process cross-sectional diagram showing the method of manufacturing the light deflector according to the first embodiment.

Subsequently, as shown in FIG. 16, an etching process is performed on the substrate 10 using the masks 31, 32. Thus, the substrate 10 is provided with through holes to thereby form the pattern of the movable plate 11, the elastic support sections 12, and the support member 13. As the etching process performed on the substrate 10, the wet etching process using KOH is used, for example.

Figure 17:
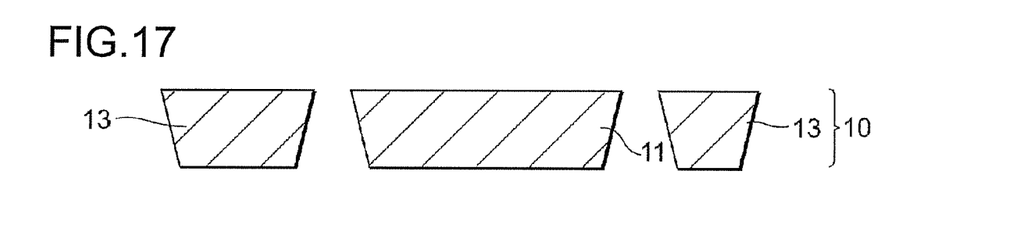
FIG. 17 is a process cross-sectional diagram showing the method of manufacturing the light deflector according to the first embodiment.

Subsequently, as shown in FIG. 17, the masks 31, 32 are removed. In the case of $SiO_2$ masks, the masks can be removed by a wet etching process with dilute hydrofluoric acid, buffered hydrofluoric acid, or the like, or a dry etching process with a $CF_4$ gas. In the case of SiN masks, they can be removed by a dry etching process with the $CF_4$ gas.

Second Process

Figure 18:
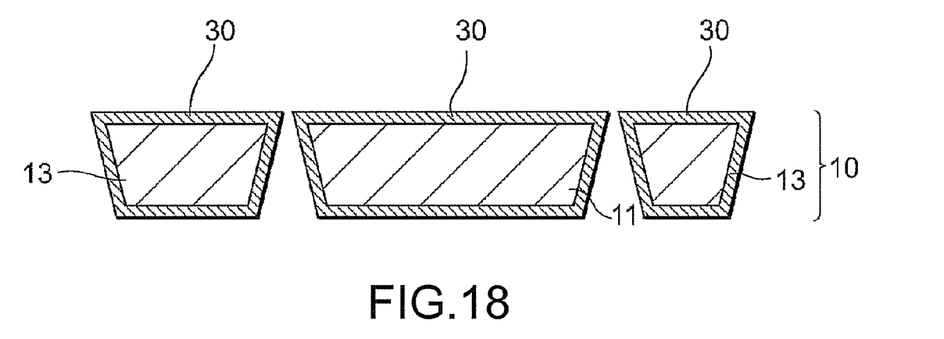
FIG. 18 is a process cross-sectional diagram showing the method of manufacturing the light deflector according to the first embodiment.

Subsequently, as shown in FIG. 18, a light absorbing film 30 is formed on the surface of the substrate 10. The formation of the light absorbing film 30 is performed by forming a chromium film by a process such as sputtering or plating. When forming the film, firstly chromium is applied from the side of the upper surface (or the lower surface) of the substrate 10, and then attached to the substrate 10. Subsequently, chromium is applied from the surface on the opposite side, and then attached to the substrate 10. If chromium is applied from the side of the upper surface of the substrate 10, since the side surfaces of the movable plate 11 and the support member 13 are located inside the respective upper surfaces, it is not achievable to attach chromium to the side surfaces. In contrast, if chromium is applied from the side of the lower surface of the substrate 10, since the side surfaces of the movable plate 11 and the support member 13 are located outside the respective lower surfaces, and the entire side surfaces can be viewed therefrom, it is also possible to attach chromium evenly to the side surfaces.

Further, regarding the elastic support sections 12, as shown in FIGS. 3 and 20, the inner side surfaces 14a among the side surfaces of the two rods 12a constituting each of the elastic support sections 12 are located outside the upper surface, and the outer side surfaces 14b are located outside the lower surface. Therefore, it is possible to attach chromium to the inner side surfaces 14a when applying chromium from the side of the upper surface of the substrate 10, and to attach chromium to the outer side surfaces 14b when applying chromium from the side of the lower surface of the substrate 10.

It should be noted that the thickness of the light absorbing film 30 is preferably about 1,500 Å. By forming the chromium film, it becomes possible to suppress the reflectance in the visible light to be equal to or lower than 10%.

Third Process

Figure 19:
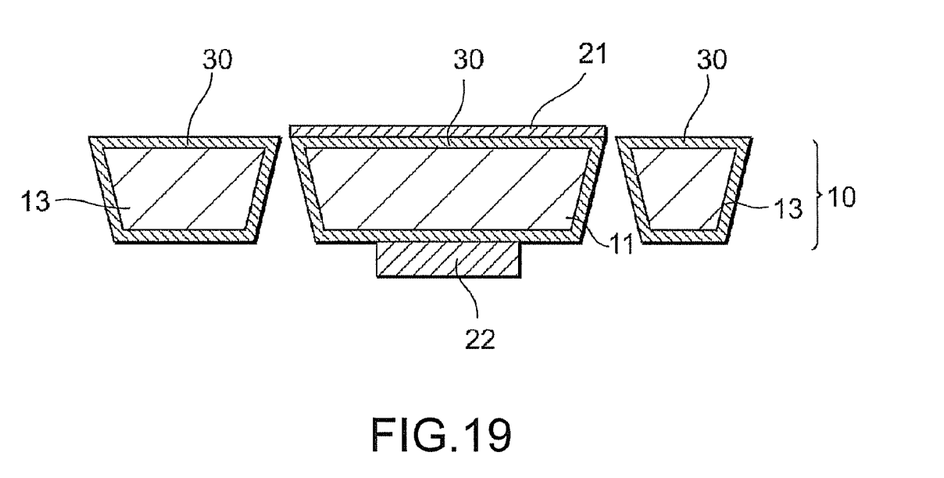
FIG. 19 is a process cross-sectional diagram showing the method of manufacturing the light deflector according to the first embodiment.

Subsequently, as shown in FIG. 19, a metal film is formed on the adverse surface of the movable plate 11, and is then patterned, thereby forming the reflecting film 21 on the movable plate 11. As the film forming method of the metal film, there can be cited a vacuum evaporation method, a sputtering method, an electroplating method, an electroless plating method, a metal foil bonding method, and so on. Further, the magnet 22 is fixed to the reverse surface of the movable plate 11 via an adhesive.

By attaching the structure, which includes the movable plate 11, the elastic support sections 12, and the support member 13 formed with a single substrate 10 in such a manner as described above, to the holder 50, the light deflector 1 is manufactured.

As described hereinabove, according to the present embodiment, the side surfaces of the movable plate 11, the elastic support sections 12, and the support member 13 are each formed of a tilted surface located outside either one of the upper surface and the lower surface of the respective components. In other words, since the movable plate 11 and the support member 13 each have a trapezoidal cross-sectional shape spreading in a direction from the lower surface toward the upper surface, the tilted surface forming the side surface is formed outside the lower surface. The elastic support sections 12 are each composed of the two rods 12a each having a parallelogram cross-sectional shape, and are each disposed so that the distance between the two rods 12a increases along the direction toward the upper surface. Therefore, the tilted surface forming the inner side surface 14a is formed outside the upper surface, and the tilted surface forming the outer side surface 14b is formed outside the lower surface. Thus, by performing the film formation using a sputtering method and so on from the both sides, namely the upper surface and the lower surface of the substrate 10, it becomes possible to form even light absorbing film 30 also on the side surfaces of the movable plate 11, the elastic support sections 12, and the support member 13.

Figure 22:
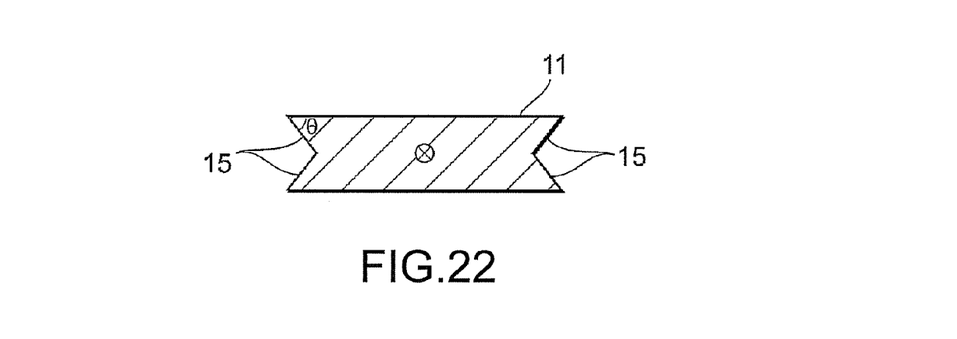
FIG. 22 is a cross-sectional view showing another example of the shape of a movable plate according to the first embodiment.

It should be noted that although in the present embodiment it is arranged that side surfaces of the movable plate 11 are formed of the tilted surface existing outside the lower surface of the movable plate 11, it is also possible to arranged that the side surfaces of the movable plate 11 are formed of surfaces existing inside both of the upper surface and the lower surface thereof as shown in FIG. 22.

As shown in FIG. 22, the side surfaces 15 of the movable plate 11 are concaved toward the rotational axis X. Specifically, if the movable plate 11 is formed using the Si wafer substrate 10 having a (100) plane as the principal surface, the side surfaces 15 of the movable plate 11 are each formed of a (111) plane of Si. The (111) plane forms an angle θ of 54.73° with the principal surface.

By concaving the side surfaces 15 of the movable plate 11 toward the axis as described above, the moment of inertia can be reduced. In other words, since the distance between the side surfaces 15 and the rotational axis X is long, the moment of inertia represented by the total sum of the products of the mass of minute fraction and the square of the distance between the minute fraction and the axis is significantly reduced. Therefore, it is possible to form the movable plate 11 so as to have a shape with the side surfaces existing inside both of the upper surface and the lower surface.

According to the first embodiment explained hereinabove, the function of the light absorbing film 30, which is formed on the tilted surfaces of the elastic support sections 12, the tilted surfaces of the support member 13, and the tilted surfaces of the movable plate 11, to prevent the light reflection can be made superior. Therefore, even if the light enters these tilted surfaces when turning the movable plate 11, the stray light can be prevented from occurring, and in the case, for example, in which the light deflector 1 is used for an image display device as described later, deterioration in image quality due to the stray light can be prevented.

Second Embodiment

Figure 23:
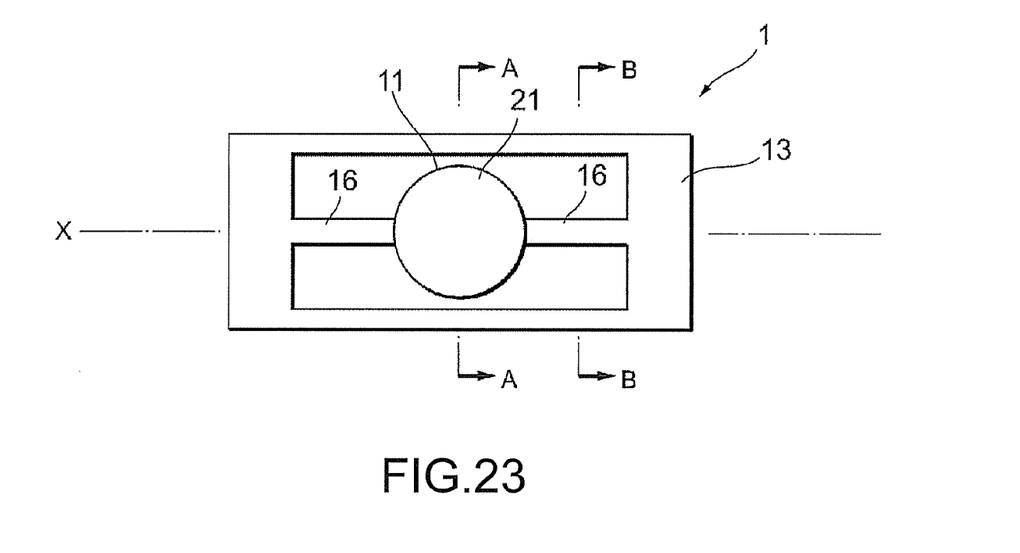
FIG. 23 is a top view showing a schematic configuration of a light deflector according to a second embodiment.
Figure 24:
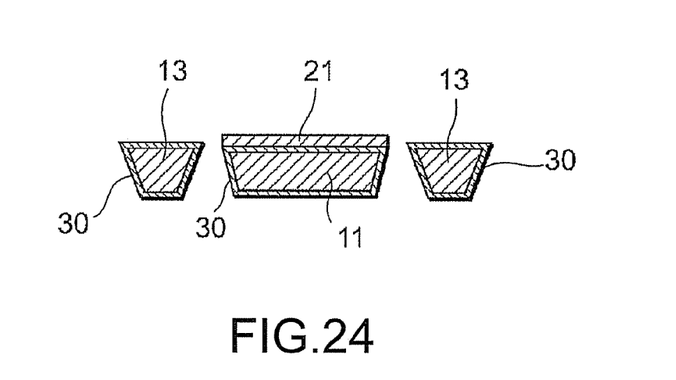
FIG. 24 is a cross-sectional view along the line A-A shown in FIG. 23.
Figure 25:
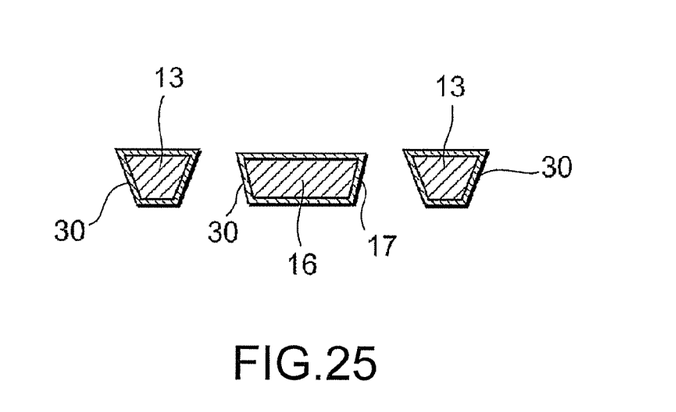
FIG. 25 is a cross-sectional view along the line B-B shown in FIG. 23.

FIG. 23 is a top view showing a schematic configuration of a light deflector 1 according to a second embodiment. FIG. 24 is a cross-sectional view along the line A-A shown in FIG. 23, and FIG. 25 is a cross-sectional view along the line B-B shown in FIG. 23. It should be noted that FIGS. 24, 25 show only a movable plate 11, elastic support sections 16, and a support member 13 of the light deflector 1. The reference numerals the same as those in FIGS. 1 through 3 denote the same or corresponding constituents.

The second embodiment is different from the first embodiment in the shape of the elastic support sections 16. As shown in the drawings, the elastic support sections 16 each have a cross-section shaped like a trapezoid spreading in a direction from the lower surface toward the upper surface. Therefore, the tilted surface forming the side surface 17 is formed outside the lower surface.

Figure 26A:
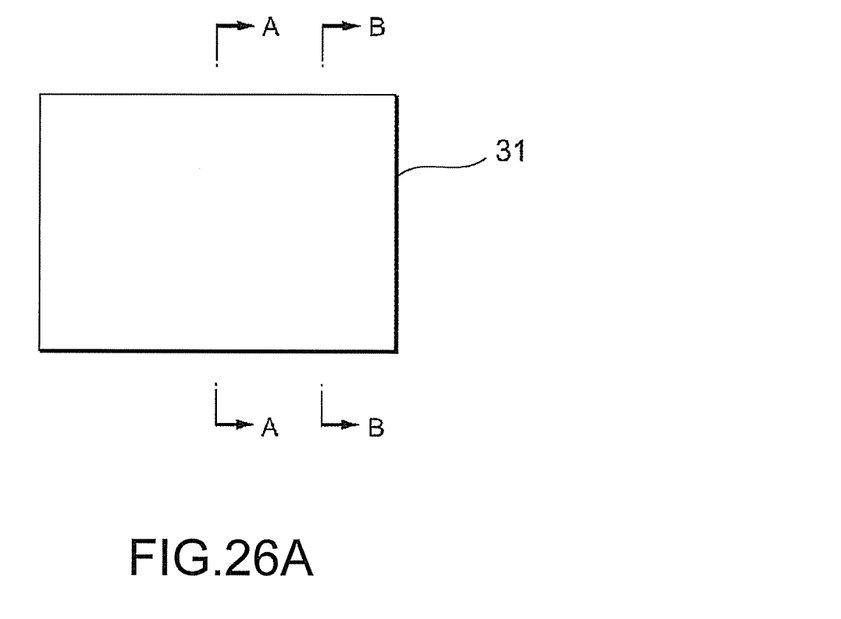
FIG. 26A is a plan view showing a pattern of a mask for the upper surface of a substrate according to the second embodiment.
Figure 26B:
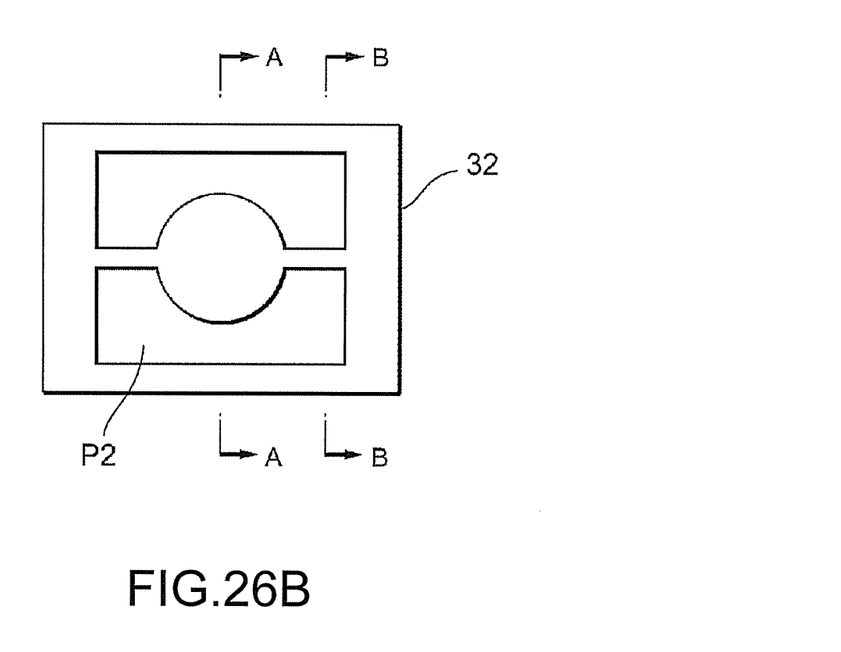
FIG. 26B is a plan view showing a pattern of a mask for the lower surface of the substrate according to the second embodiment.
Figure 27:
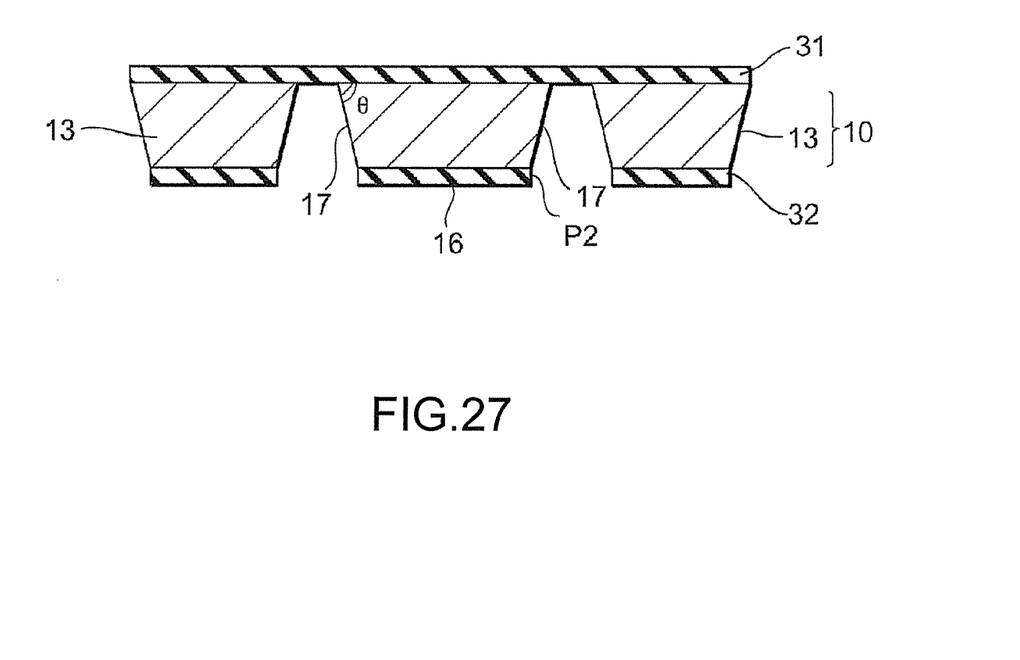
FIG. 27 is a process cross-sectional diagram showing a method of manufacturing the light deflector according to the second embodiment.

FIG. 26A is a plan view showing a pattern of the mask 31 on the side of the upper surface of the substrate 10 in the case in which the movable plate 11, the elastic support sections 16, and the support member 13 by an etching process using the substrate 10, and FIG. 26B is a plan view showing a pattern of the mask 32 on the side of the lower surface of the substrate 10. Further, FIG. 27 shows a cross-sectional view along the line B-B shown in FIGS. 26A and 26B. Since the plane of Si with the crystal plane direction of (111) functions as an etching stopper in the wet etching process with KOH or the like, the side geometry composed of the surfaces having angles of $\theta=54.73°$ with the adverse surface is formed automatically. It should be noted that the cross-sectional surface along the line A-A shown in FIGS. 26A and 26B is the same as shown in FIG. 16 in the first embodiment.

In the second embodiment, the opening pattern P1 is not provided to the side of the upper surface of the substrate 10. Therefore, in the second embodiment, since it is sufficient to perform an etching process only from the side of the lower surface of the substrate 10, it is possible to omit the process corresponding to FIGS. 11 through 15 in the first embodiment.

In the second embodiment, the side surfaces of the movable plate 11, the elastic support sections 16, and the support member 13 are each formed of a tilted surface located outside either one of the upper surface and the lower surface of the respective components. Specifically, the movable plate 11, the elastic support sections 16, and the support member 13 each have a trapezoidal cross-sectional shape spreading in a direction from the lower surface toward the upper surface. Thus, by performing the film formation using a sputtering method and so on from the both sides, namely the upper surface and the lower surface of the substrate 10, it becomes possible to form even light absorbing film 30 also on the side surfaces of the movable plate 11, the elastic support sections 16, and the support member 13.

Third Embodiment

Figure 28:
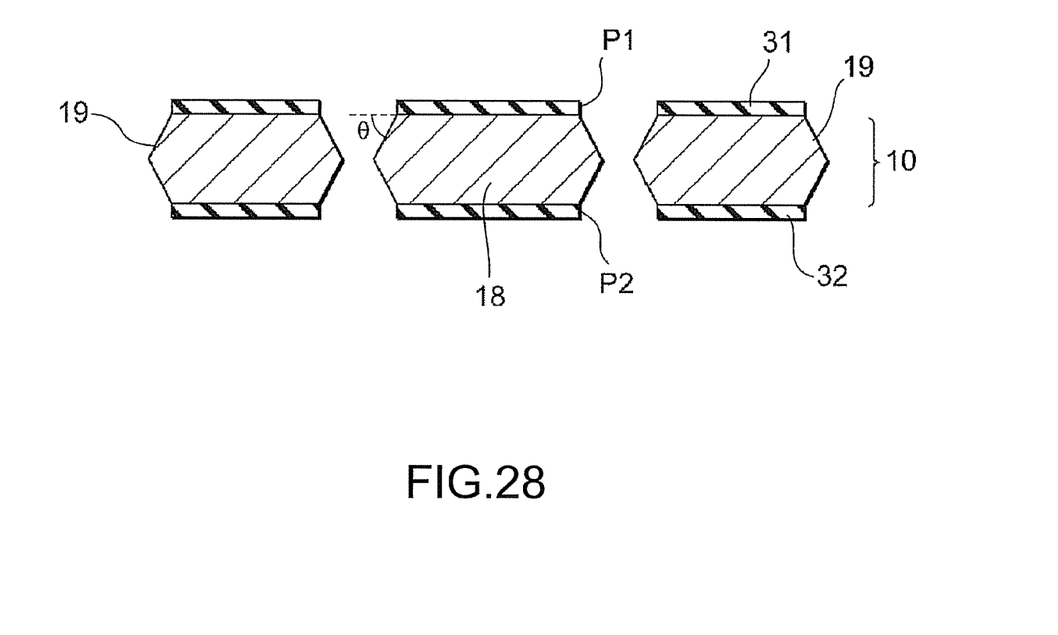
FIG. 28 is a process cross-sectional diagram showing a method of manufacturing a light deflector according to a third embodiment.

FIG. 28 is a cross-sectional view showing patterns of the masks 31, 32 in the case of forming the light deflector 1 according to the third embodiment by etching the substrate 10. FIG. 28 shows a cross-sectional surface along the line A-A shown in FIG. 1. By forming the masks 31, 32 as shown in FIG. 28, it is possible to form the movable plate 18 and the support member 19 each having a hexagonal cross-sectional shape. When a bottom of a hole formed by etching from the upper surface of the substrate 10 and a bottom of a hole formed by etching from the lower surface of the substrate 10 have contact with each other, a hole penetrating the substrate 10 is formed. On this occasion, since the plane of Si with the crystal plane direction of (111) functions as an etching stopper in the wet etching process with KOH or the like, the side geometry composed of the surfaces having angles of $\theta=54.73°$ with the adverse surface is formed automatically. Therefore, in the case of working the substrate 10 using the wet etching process, the side surfaces of the movable plate 18 and the support member 19 are each generally formed so as to have a convex shape toward the side opposite to the rotational axis X as shown in FIG. 28. It should be noted that regarding the elastic support sections, the hexagonal cross-sectional shape can be formed by similarly forming the mask pattern.

If the cross-sectional surface is formed to have a hexagonal shape, since the side surface is composed of two tilted surfaces, and the tilted surface on the side of the upper surface exists outside the upper surface and the tilted surface on the side of the lower surface exists outside the lower surface, by performing the film formation using a sputtering process from the both sides, namely the upper surface and the lower surface of the substrate 10, it becomes possible to form the even light absorbing film 30 also on the side surfaces of the movable plate 18 and the support member 19.

Display Device

Figure 29:
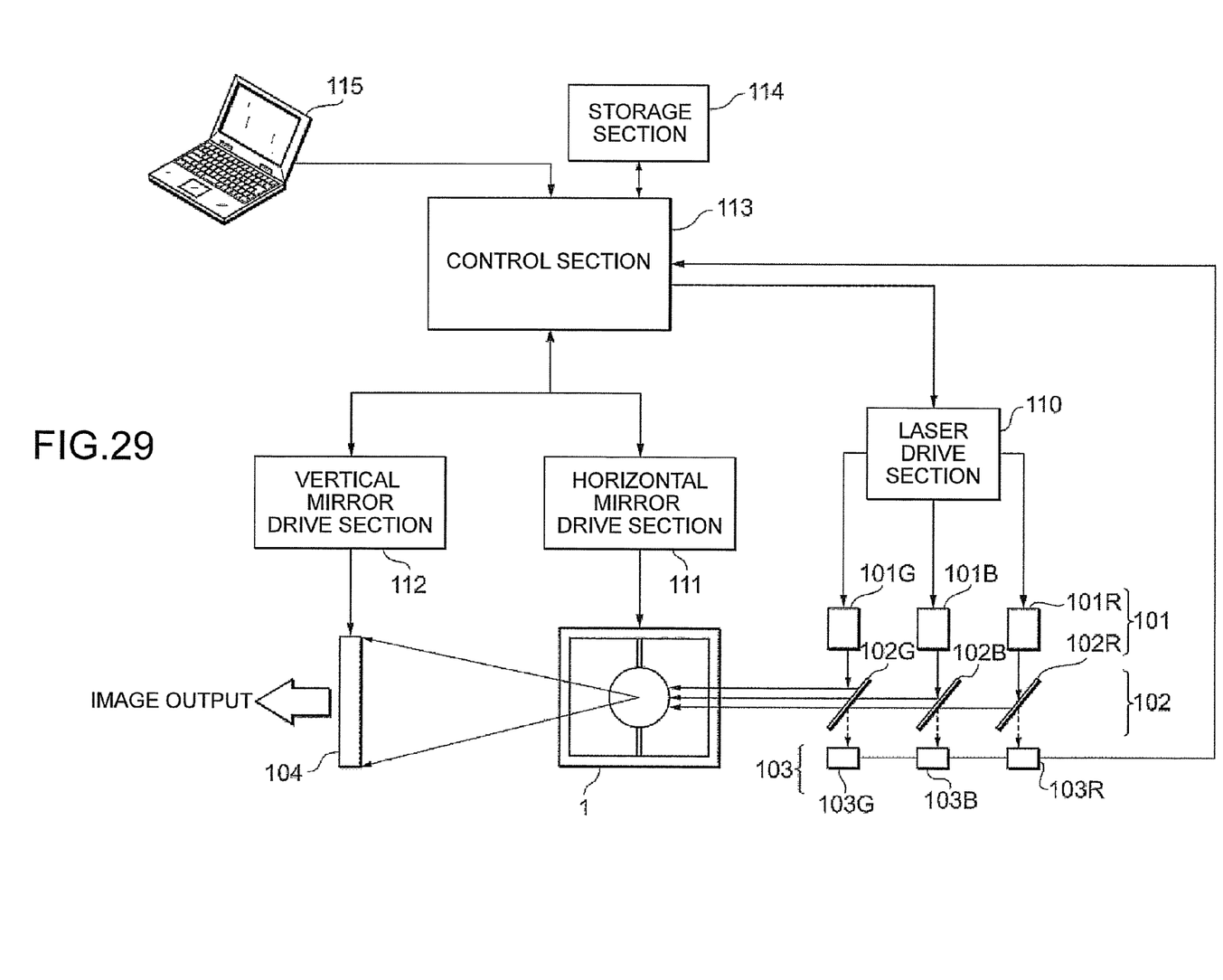
FIG. 29 is a schematic configuration diagram showing a display device using the light deflector according to the embodiment of the invention.

As an application example (an example of the image display device) of the light deflector 1 according to the embodiment of the invention, a projection display device (a projector) will be explained. FIG. 29 is a diagram showing a schematic configuration of the projection display device. A light scanning device shown in FIG. 29 uses the light deflector 1 according to the embodiment of the invention as a horizontal scanning mirror.

The light scanning device shown in FIG. 29 is provided with laser sources 101, dichroic mirrors 102, photodiodes 103, and a vertical mirror 104 besides the light deflector 1.

The laser sources 101 include a red laser source 101R for emitting a red laser beam, a blue laser source 101B for emitting a blue laser beam, and a green laser source 101G for emitting a green laser beam. It should be noted that laser sources with two or less colors, or with four or more colors can also be used.

The dichroic mirrors 102 include a dichroic mirror 102R for reflecting the red laser beam from the red laser source 101R, a dichroic mirror 102B for reflecting the blue laser beam and transmitting the red laser beam, and a dichroic mirror 102G for reflecting the green laser beam and transmitting the blue laser beam and the red laser beam. Due to the three dichroic mirrors 102, a combined light beam of the red laser beam, the blue laser beam, and the green laser beam enters a vibrating mirror (light reflector) 1.

The photodiodes 103 (103R, 103G, 103B) detect intensities of the red laser beam, the green laser beam, and the blue laser beam transmitted through the respective dichroic mirrors 102R, 102G, and 102B without being reflected.

The light deflector 1 scans the laser beam transmitted from the dichroic mirror 102 in a horizontal direction (a direction perpendicular to the axis line X). As described above, the light reflector 1 is a resonant mirror formed of the MEMS.

The vertical mirror 104 scans the laser beam, which is reflected by the light deflector 1, in a vertical direction. The vertical mirror 104 is configured with, for example, a galvanometer mirror. The galvanometer mirror is a deflector provided with a mirror attached with a shaft so that the rotational angle of the mirror can be changed in accordance with a electrical vibration. An image is displayed due to the horizontal scan of the laser beam by the light deflector 1 and the vertical scan of the laser beam by the vertical mirror 104.

The light scanning device according to the present embodiment is further provided with a laser drive section 110 for driving the laser sources 101, a horizontal mirror drive section 111 for driving the light deflector 1, a vertical mirror drive section 112 for driving the vertical mirror 104, a control section 113 assuming control of overall operations, and a storage section 114 as a drive control system of the laser sources 101, the light deflector 1, and the vertical mirror 104.

Based on the image information transmitted from various types of video sources 115 such as a personal computer or a cellular phone, the control section 113 controls operations of the laser drive section 110, the horizontal mirror drive section 111, and the vertical mirror drive section 112 in order for displaying the image from these sources.

The storage section 114 is composed of, for example, a ROM for storing various types of programs, a RAM for storing variables or the like, and a nonvolatile memory.

By applying the light deflector 1 according to the present embodiment to a display device, it becomes possible to realize a display device with a preferable display performance.

The invention is not limited to the explanation of the embodiments described above. For example, the movable plate can have a polygonal shape instead of the circular shape. Further, although the movable plate of the type driven one-dimensionally with one-degree-of-freedom is described as an example in the first and the second embodiments, it is also possible to adopt a movable plate of the type driven two-dimensionally, or a movable plate of the type driven one-dimensionally with two-degree-of-freedom. If the vibration mirror of the type driven two-dimensionally is used, the vertical mirror 104 can be eliminated.

Further, the light deflector 1 can be applied to a laser printer besides the display device.

In addition to the above descriptions, various modifications are possible within the scope and the spirit of the present invention.

The entire disclose of Japanese Patent Application No.: 2009-181273, filed Aug. 4, 2009 and 2010-106624, filed May 6, 2010 are expressly incorporated by reference herein.

What is claimed is:

1. A light deflector comprising:
   a movable plate;
   an elastic support section having a first end coupled to the movable plate and adapted to support the movable plate rotatably around a predetermined axis by a torsional deformation of the elastic support section, the elastic support section defining the predetermined axis;
   a support member coupled to a second end of the elastic support section; and
   a light absorbing section having a light absorbing property,
   wherein the elastic support section and the support member each have an upper surface, a lower surface, and a side surface extending between the upper and lower surfaces, the side surface being formed of one or more tilted surfaces existing outside either one of the upper surface and the lower surface, and
   the light absorbing section is disposed on the upper surface and the side surface of the each of the elastic support section and the support member.

2. The light deflector according to claim 1, wherein
   the movable plate has an upper surface, a lower surface, and a side surface extending between the upper and lower surfaces, the upper surface being provided with a reflecting section, and the side surface being formed of one or more tilted surfaces existing outside either one of the upper surface and the lower surface of the movable plate, and
   the light absorbing section is disposed on the side surface of the movable plate.

3. The light deflector of claim 1, wherein the light absorbing section is disposed on the lower surface of the elastic support section.

4. A light deflector comprising:
   a movable plate provided with a light reflecting section having light reflectivity, the movable plate having an upper surface, a lower surface, and a side surface extending between the upper and lower surfaces, the upper surface being provided with the light reflecting section, and the side surface being formed of one or more tilted surfaces existing outside either one of the upper surface and the lower surface of the movable plate;
   a support section;
   an elastic coupling section adapted to couple the movable plate rotatably to the support section around a predetermined axis by a torsional deformation of the elastic coupling section, the elastic coupling section defining the predetermined axis; and
   a light absorbing section having a light absorbing property,
   wherein the coupling section has a pair of tilted surfaces, a distance between the tilted surfaces gradually increasing along a direction from a first surface side of the movable plate toward a second surface side of the movable plate in a cross-sectional view perpendicular to a central axis of rotation of the movable plate, and are tilted with respect to a normal line of a plate surface of the movable plate corresponding to increase in the distance, and
   the light absorbing section is disposed on the tilted surfaces of the each of the movable section and the coupling section.

5. The light deflector according to claim 4, wherein
   the support section has a pair of tilted surfaces, a distance between the titled surfaces gradually increasing along a direction from a first surface side of the movable plate toward a second surface side of the movable plate in a cross-sectional view perpendicular to a central axis of rotation of the movable plate, and are tilted with respect to a normal line of a plate surface of the movable plate corresponding to increase in the distance, and
   the light absorbing section is disposed on the tilted surfaces of the support section.

6. An image display device comprising:
   a light emitting section adapted to emit light; and
   the light deflector according to claim 4,
   wherein the image display device displays an image by scanning the light, which is emitted from the light emitting section, with the light deflector.

7. The light deflector of claim 4, wherein the pair of tilted surfaces extend between an upper surface and a lower surface, and the light absorbing section is disposed on the lower surface.

8. A method of manufacturing a light deflector, comprising:
   (a) forming
   a movable plate having an upper surface, a lower surface, and a side surface extending between the upper and lower surfaces,
   an elastic support section having an upper surface, a lower surface, and a side surface extending between the upper and lower surfaces, having a first end coupled to the movable plate, and adapted to support the movable plate rotatably around a predetermined axis by a torsional deformation of the elastic support section, the elastic support section defining the predetermined axis, and
   a support member coupled to a second end of the elastic support section;

(b) forming a light absorbing section on the upper surface and the side surface of each of the movable plate and the elastic support section; and (c) forming a reflecting section on the upper surface of the movable plate, wherein in step (a), the side surface of each of the movable plate and the elastic support section are formed of one or more tilted surfaces existing outside either one of the upper surface and the lower surface of each of the movable plate and the elastic support section.

9. The method of manufacturing a light deflector according to claim 8, wherein in step (a), the side surface of the support member is formed of one or more tilted surfaces existing outside either one of the upper surface and the lower surface of the support member.

10. The method of claim 8, wherein the light absorbing section is disposed on the lower surface of the elastic support section.

* * * * *